(12) United States Patent
Valois et al.

(10) Patent No.: US 10,676,014 B2
(45) Date of Patent: Jun. 9, 2020

(54) LIGHTING AND/OR SIGNALING SYSTEM FOR MOTOR VEHICLES

(71) Applicant: VALEO VISION BELGIQUE, Meslin l'Eveque (BE)

(72) Inventors: Christophe Valois, Meslin l'Eveque (BE); Beny Grigorescu, Meslin l'Eveque (BE); Dirkie Sacchet, Meslin l'Eveque (BE)

(73) Assignee: VALEO VISION BELGIQUE, Meslin l'Eveque (BE)

( * ) Notice: Subject to any disclaimer, the term of this patent is extended or adjusted under 35 U.S.C. 154(b) by 0 days.

(21) Appl. No.: 15/551,396

(22) PCT Filed: Feb. 17, 2016

(86) PCT No.: PCT/EP2016/053396
§ 371 (c)(1),
(2) Date: Aug. 16, 2017

(87) PCT Pub. No.: WO2016/131891
PCT Pub. Date: Aug. 25, 2016

(65) Prior Publication Data
US 2018/0065536 A1    Mar. 8, 2018

(30) Foreign Application Priority Data

Feb. 17, 2015    (FR) .................................... 15 51306

(51) Int. Cl.
*B60Q 1/00*    (2006.01)
*B60Q 1/20*    (2006.01)
(Continued)

(52) U.S. Cl.
CPC .......... *B60Q 1/0011* (2013.01); *B60Q 1/0047* (2013.01); *B60Q 1/20* (2013.01);
(Continued)

(58) Field of Classification Search
CPC .......... F21V 7/0091; F21V 7/06; F21V 14/04; B60Q 1/0011
See application file for complete search history.

(56) References Cited

U.S. PATENT DOCUMENTS

| 4,833,573 | A | * | 5/1989 | Miyauchi | ............... | B60Q 1/115 |
| | | | | | | 362/460 |
| 5,499,166 | A | * | 3/1996 | Kato | .................... | B60Q 1/0011 |
| | | | | | | 362/559 |

(Continued)

FOREIGN PATENT DOCUMENTS

| DE | 101 09 357 A1 | 9/2002 |
| DE | 10 2005 050 420 | 4/2007 |
| GB | 2 245 697 A | 1/1992 |

OTHER PUBLICATIONS

International Search Report dated Apr. 29, 2016 in PCT/EP2016/053396 filed Feb. 17, 2016.

(Continued)

*Primary Examiner* — Thien M Le
*Assistant Examiner* — Asifa Habib
(74) *Attorney, Agent, or Firm* — Oblon, McClelland, Maier & Neustadt, L.L.P.

(57) ABSTRACT

The invention relates to a lighting and/or signaling system for motor vehicles, including a light source and a lens configured for receiving light rays coming directly or indirectly from the source through an input surface and for emitting a first output beam providing a first regulatory lighting and/or signaling function through an output surface. A waveguide is configured for directly or indirectly receiving light rays coming from the source through an input surface and for emitting a second output beam through an output surface, wherein a coupling zone of the waveguide is (Continued)

located opposite a portion of either the input surface of the lens or the output surface of the lens.

20 Claims, 3 Drawing Sheets

(51) Int. Cl.
*F21S 43/14* (2018.01)
*F21S 43/20* (2018.01)
*B60Q 1/34* (2006.01)
*F21S 43/245* (2018.01)
*F21S 43/237* (2018.01)
*F21S 43/247* (2018.01)
*F21S 41/24* (2018.01)
*F21S 41/63* (2018.01)
*F21S 43/27* (2018.01)
*F21S 41/141* (2018.01)
*F21S 41/29* (2018.01)
*F21S 41/43* (2018.01)
*F21S 43/236* (2018.01)
*F21Y 115/10* (2016.01)

(52) U.S. Cl.
CPC .............. *B60Q 1/34* (2013.01); *F21S 41/141* (2018.01); *F21S 41/24* (2018.01); *F21S 41/29* (2018.01); *F21S 41/43* (2018.01); *F21S 41/635* (2018.01); *F21S 43/14* (2018.01); *F21S 43/236* (2018.01); *F21S 43/237* (2018.01); *F21S 43/245* (2018.01); *F21S 43/247* (2018.01); *F21S 43/26* (2018.01); *F21S 43/27* (2018.01); *B60Q 2400/30* (2013.01); *F21Y 2115/10* (2016.08)

(56) References Cited

U.S. PATENT DOCUMENTS

| 5,709,453 | A | * | 1/1998 | Krent | B60Q 1/0011 362/496 |
| 5,918,973 | A | * | 7/1999 | Nojiri | B60Q 1/0011 362/511 |
| 6,238,074 | B1 | * | 5/2001 | Hulse | B60Q 1/0011 362/551 |
| 2003/0174509 | A1 | * | 9/2003 | Futami | B60Q 1/0052 362/517 |
| 2007/0008734 | A1 | * | 1/2007 | Bogner | B60Q 1/04 362/509 |
| 2007/0047249 | A1 | * | 3/2007 | Kogo | B60Q 1/0011 362/538 |
| 2015/0003091 | A1 | * | 1/2015 | Chen | B60Q 1/0011 362/511 |
| 2015/0184823 | A1 | * | 7/2015 | Ladenburger | G02B 6/005 362/511 |
| 2016/0290583 | A1 | * | 10/2016 | Suwa | F21S 41/285 |

OTHER PUBLICATIONS

International Search Report dated Apr. 29, 2016 in PCT/EP2016/053396 dated Feb. 17, 2016.

* cited by examiner

LIGHTING AND/OR SIGNALING SYSTEM FOR MOTOR VEHICLES

The present invention notably relates to a lighting and/or signaling system.

A preferred application relates to the motor vehicle industry, for the equipment of vehicles, in particular for the production of devices likely to be able to emit several light beams, also called lighting functions, generally complying with regulations.

The invention can notably allow the production of a fog beam in combination with a so-called style function of much lower intensity.

Lighting and signaling devices known up to the present time are provided for emitting for example:
- a low beam, characterized by an absence of light above a plane inclined downward by 1% on the side of the traffic in the other direction, and above another plane inclined by 15 degrees with respect to the preceding one on the side of the traffic in the same direction, these two planes defining a cut-off complying with European regulations;
- a high beam having no cut-off, and characterized by maximum lighting along the axis of the vehicle;
- a fog beam, characterized by a flat cut-off and a large lighting width;
- a signaling beam for town driving, also called a town light;
- a signaling beam for indicating the driver's intention to change direction or traffic lane;
- a daytime running light also known by its acronym DRL (standing for "Daytime Running Light" in English). It will be noted that the evolution of requirements with regard to signaling by motor vehicles, for example the regulations regarding daytime running lights of the European Community entitled "ECE regulation R87: Daytime Running Lamp" hereafter denoted by the abbreviation DRL, raises various problems with regard to the production of such a DRL function, imposing on vehicles the permanent turning on of relatively powerful signaling lights during daytime driving;
- a beam called "additional high beam" able to provide a lighting beam such that, when it is juxtaposed with a low beam, a beam is obtained which meets the high beam lighting standards.

At present, when different lighting and/or signaling functions are desired, it is generally necessary to have recourse to separate devices to be combined in a common headlamp volume. It can be understood that the overall dimensions of such a combination are large. Another possibility is described in DE A1 102005050420 with a single source whose emitted light is shared between a projection lens of a main beam, the lens being mounted in a headlamp body, and a waveguide. The latter is a thin fin attached to the body of the headlamp which comprises a complex cavity between the source and the lens so as to deflect, by reflection, the rays from the source to the input of the waveguide.

This device is complex because it imposes a very particular design of the headlamp for the attachment of the waveguide and for the reflection of the light towards the latter. This makes it poorly adaptable to the shapes and functions of headlamps. Moreover, despite a complex reflection cavity and waveguide input, the light retrieved by the latter remains very weak.

The invention makes it possible to solve all or some of the disadvantages of the present day techniques.

It relates in particular to a lighting and/or signaling system for motor vehicles, comprising a light source, a lens configured for receiving light rays coming directly or indirectly from the source through an input surface and for emitting a first output beam providing a first, preferably regulatory, lighting and/or signaling function through an output surface, and a waveguide configured for directly or indirectly receiving light rays coming from the source through an input surface and for emitting a second output beam through an output surface.

Advantageously, this system is such that a coupling zone of the waveguide is located at least partially and possibly totally opposite a portion of either the input surface of the lens or the output surface of the lens.

The invention can thus be used in various types of headlamp without the impact of the addition of a waveguide for a secondary function making the design modification too complex. For example, even on the basis of a fog beam function with adjustable inclination, the function provided by the waveguide does not hinder main fog beam function.

In general, the coupling zone is an zone of the waveguide arranged for coupling light rays into the guide, that is to say for deflecting light rays reaching this zone into the guide in such a way that these light rays propagate inside the guide by total internal reflection. According to one possibility, the coupling zone extends from an input surface of the guide and preferably comprises, downstream of that input surface, a zone of collimation and/or of concentration of the input rays, so as to feed the waveguide with light.

According to one embodiment, the second beam makes it possible to carry out a second, preferably regulatory, lighting and/or signaling function.

Possibly, the second regulatory lighting and/or signaling function is separate from the first regulatory lighting and/or signaling function.

According to another non-limiting possibility, the second beam does not have a regulatory lighting and/or signaling function.

In an example embodiment, the lens and the waveguide are mounted on a body. The latter can be mounted such that it is mobile in rotation in said system, for example in order to allow the assembly formed by the guide and the lens to follow a movement, according to at least one pivoting direction.

The lens can itself be mounted such that it is mobile in rotation on the body. Similarly or alternatively, the waveguide is mounted such that it is mobile in rotation on the body.

According to one embodiment, the coupling zone of the waveguide is formed by at least a portion of the input surface of the waveguide.

The coupling zone of the waveguide is possibly formed by at least an elbow bend portion of the waveguide.

According to one possibility which is alternative or which can be combined with any other aspect of the invention, the input surface of the waveguide is located at the mouth of a part of the coupling zone provided with a portion having a decreasing cross-section from the input surface to an elongated body upon which the output surface of the waveguide is located.

This form of waveguide input makes it possible to capture a large quantity of the light coming from the source without however necessarily having recourse to complex means such as light ray deflections.

In a preferred case, the input surface of the waveguide exhibits a concave curvature in a plane comprising the mean direction of emission of the source and the axis of rotation of the relative mobility of the lens and the waveguide. This curvature can make it possible to follow the contour of the cooperating surface of the lens as closely as possible and/or not to interfere with the rotational travel of the lens. This optimizes moreover the quantity of light gathered by the waveguide.

According to an embodiment which is alternative or which can be combined with any other embodiment of the invention, the input surface of the waveguide comprises at least one cavity. In a preferred case the input surface of the waveguide comprises at least two cavities and, preferably, the cavities will then be disposed on either side of the center of the input surface of the waveguide. In a particular case, each cavity has a substantially hemispherical shape.

The presence of one or more cavities on the input surface of the waveguide, preferably of substantially hemispherical shape, makes it possible to diffuse the light at the input of the waveguide and therefore to homogenize the light within the waveguide.

According to one embodiment, at least one intermediate shield obturates a portion of the output surface of the waveguide. This or these shields make it possible either to limit or eliminate overlapping between the first and second beams or to create style effects by generating discontinuities in the emission of light along the waveguide.

Other optional features of the lighting and/or signaling system according to the invention which can be used in a combined or alternative manner are mentioned below:
  the input surface of the waveguide is configured so that its orthogonal projection in a plane perpendicular to the optical axis of the lens overlaps an orthogonal projection of said at least one from among the input surface of the lens and the output surface of the lens in said perpendicular plane;
  the output surface of the waveguide is located on an elongated body of the waveguide;
  the output surface comprises means of decoupling the light;
  the decoupling means comprise at least one element chosen from among prisms and/or striae and/or random shapes. The random shapes are for example predetermined shapes, which differ by their dimensions and/or by their geometry, applied randomly on the waveguide, that is to say that there is no voluntary distribution or choice of shapes of this or these decoupling means on the waveguide;
  the cross-section of the elongated body is smaller than the cross-section of the input surface of the waveguide;
  the input surface of the waveguide is located at the mouth of a portion having a reducing cross-section from the input surface as far as the elongated body;
  the input surface of the waveguide has a concave curvature in a plane comprising the mean direction of emission of the source and the axis of rotation of the relative mobility of the lens and the waveguide;
  the input surface of the waveguide is a surface located opposite a portion of the output surface of the lens;
  the output surface of the lens is convex and has a curvature identical to that of the input surface of the waveguide in a plane comprising the mean direction of emission of the source and the axis of rotation of the relative mobility of the lens and the waveguide;
  the input surface of the waveguide is a surface located opposite a portion of the input surface of the lens;
  at least one intermediate shield obturates a portion of the output surface of the waveguide;
  several intermediate shields are spaced along the output surface of the waveguide;
  an intermediate shield is configured for obturating a portion of the output surface of the waveguide at the upstream end of said output surface according to the direction of propagation of light in the waveguide;
  the first output beam is a beam of the fog beam type;
  the second output beam is a beam of the style function type.

In the features described above and in the flowing description, the terms relative to verticality, horizontality and transversality are understood to be with respect to the position in which the lighting and/or signaling system is intended to be mounted in a vehicle.

The invention also relates to a vehicle equipped with at least one device such as described above.

The device can be integrated in a headlamp.

Other features, purposes and advantages of the present invention will become apparent on reading the following detailed description and on looking at the appended drawings given as non-limiting examples and in which.

Figure 1:
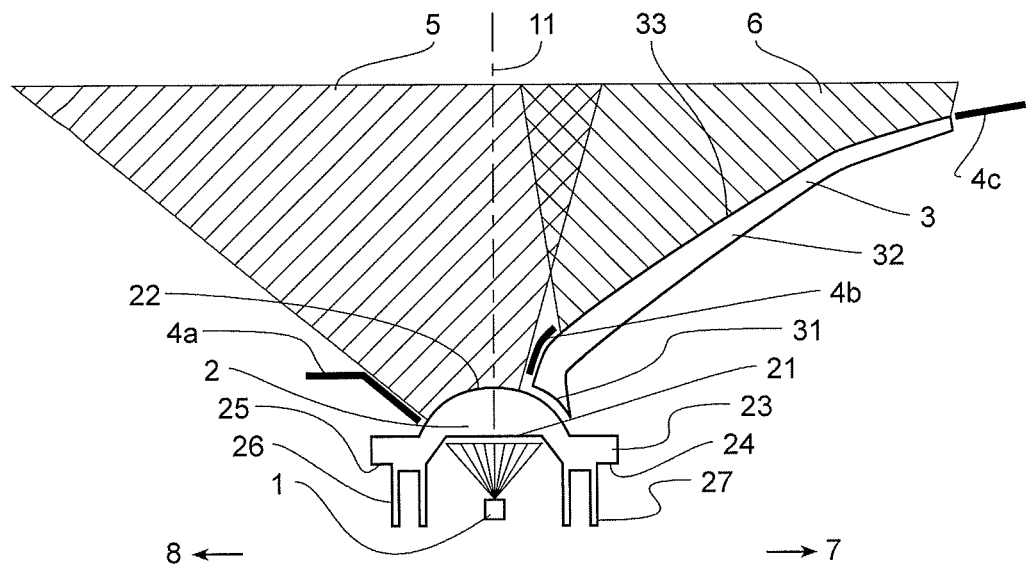
FIG. 1 shows a cross-section of a first embodiment of the invention.

In general, the present invention can use a light source of the light emitting diode, also commonly called LED, type. Notably, this LED can be provided with at least one chip able to emit light whose intensity is advantageously adjusted according to the lighting and/or signaling function to be carried out. Moreover, the term "light source" is understood here to be an assembly of at least one elementary source such as an LED able to produce a flow of light resulting in generating at the output of the device of the invention at least one output flow of light satisfying at least one desired function. The source is generally associated with a support, connection means and heat dissipation means. Preferably, the source is configured for emitting in a mean emission direction which is perpendicular the plane of the chip of the LED if this source technique is used.

The terms "vertical" and "horizontal" are used in the present description to denote directions according to an orientation perpendicular to the plane of the horizon for the term "vertical" and according to an orientation parallel with the plane of the horizon for the term "horizontal". They are to be considered in the operating conditions of the device in a vehicle. The use of these words does not signify that slight variations about the vertical and horizontal directions are excluded from the invention. For example, an inclination relative to these directions of the order of + or −10° is here considered as a minor variation about the two preferred directions.

The term "low" or low part is generally understood to be a part of an element of the invention located, in a vertical plane, below the optical axis. The term "high" or high part is understood to be a part of an element of the invention located, in a vertical plane, above the optical axis. The term "parallel" or the notion of merged axes or lines is here understood to be, notably with manufacturing or assembly tolerances, substantially parallel directions or substantially merged axes in this context.

The elements of the system such as described here form all or part of at least two beams carrying out two lighting and/or signaling functions. This does not exclude other means, notably optical, from being interposed between said elements and a terminal projection zone on the optical path of the rays coming from the elements. Moreover, the lighting functions can obey regulatory requirements, for example the standard ECE regulation R87: Daytime Running Lamp or other European standards or standards of other countries or regions. The style functions do not normally obey standards considering that they do not usually have a lighting and/or signaling function but are solely of aesthetic interest.

In general, the terms such as input surface or output face or output surface are understood to be surfaces of components defining, with a surrounding medium, diopters for the propagation light waves. It is therefore a matter of optically useful surfaces, that is to say at the level of which light rays pass through. These surfaces can be surrounded by optically inactive surfaces, for example a lens mount. Thus the expression according to which the input surface 31 of the waveguide 3 consists of a surface located opposite a portion of one from among the input surface 21 of the lens 2 and the output surface of the lens 2 implies that the input surface 31 of the waveguide 3 partly occults the first beam passing through the lens 2 (or occupies a space where the rays from the source 1 participate in the first beam in the absence of the input surface 31 of the waveguide 3).

The system of the invention can also be used for producing other lighting functions apart from the first and second beams described in detail below.

In the example shown in the different figures, the first beam 5 typically corresponds to the emission of a light beam having a fog beam function. The second beam 6 corresponds in turn to a style function, that is to say a light emission distributed over an output surface of a waveguide having an elongated portion so as to produce a light emission generally of low amplitude and making it possible to emphasize the shape of a part of the headlamp, generally for aesthetic purposes.

In the case of FIG. 1, a light source 1, which can be of the type previously described and notably formed by a light emitting diode, is positioned upstream of an optical system for generating the first beam 5. In the example, this optical system comprises a lens 2 notably of the plano-convex type. The input surface 21 receives the light rays emitted by the source 1; it is planar here. An output diopter is formed at the level of the output surface 22 of the lens 2 which has for example a convex shape. The output beam 5 thus constituted is of the divergent type. It is understood that the invention does not exclude supplementary optical means from being present, either between the source 1 and the lens 2, or downstream from the lens 2. For example, reflection means could be present along the propagation path of the light rays.

In the case of an application to fog lamps and possibly to other types of signaling and/or lighting function, it can be advantageous for the emission of the first beam 5 to have adjustable inclination, in particular in the vertical direction. For this purpose, in the example shown in FIG. 1, the lens 2 cooperates with a pivoting axis 23 materialized by lateral mounts 24, 25 in the form of circular protuberances each forming a bearing allowing the pivoting of the lens 2 about the axis 23. In this example, means of transmission of rotational movement are provided with drive lugs 26, 27 organized in pairs at the level of each of the lateral mounts 24, 25. In a way which is not shown, each pair of drive lugs 26, 27 can cooperate with a movement transmission system for example using a worm gear between the lugs of a pair 26, 27. These mount and drive parts of the lens 2 do not form part of the active optical system and notably of the input surface 21 and of the output surface 22 of the lens 2. These parts are generally peripheral with respect to the lens 2.

Besides the first beam thus generated, the present invention produces the emission of a second beam 6. The latter is produced by means of a waveguide 3 having, in the case of FIG. 1, an input surface 31 through which the light rays can be admitted, and an elongated body 32 at the level of which an output surface 33 produces the emission of the second beam 6. Advantageously, both the first and second beams 5, 6 emit towards the front of the vehicle substantially in the same direction.

Advantageously, the waveguide 3 is configured for producing a light emission over a portion of space having a cross-section narrower than that of the first beam 5. On the contrary, it is advantageous that the waveguide 3 produces an emission distributed along its length in such a way as to emit light along the waveguide 3, from an end placed closed to the input surface 31 up to a distal end. For example, in FIG. 1, the waveguide extends in a longitudinal direction in a plane containing the mean direction of emission 11 of the light source 1 and intersecting the lens 2 transversely. Again in this example, the elongated body 32 of the waveguide 3 extends from the input surface 31 to a part farther towards the inside 7 the vehicle than towards the outside 8 of the vehicle. Thus, relative to the equipped vehicle, the emission produced by the waveguide 3 is distributed in a direction going towards the center of the front face (or of the rear face) of the vehicle.

In general, the input surface 31 of the waveguide 3 is configured for capturing a portion of the light rays normally intended to participate in the first beam 5. For this purpose, in the embodiment shown in FIG. 1, the input surface 31 is located downstream of the output surface 22 of the lens 2 so as to capture a portion of the rays of the first beam 5 and to introduce it into the waveguide 3. The input surface 31 is therefore located in such a way as to interfere with the path of certain light rays normally intended for the first beam 5. In particular, in this example, the input surface 31 is located opposite the output surface 22 of the lens 2. Moreover, it can be advantageous to give the input surface 31 a particular shape making it possible to increase the quantity of light admitted into the waveguide 3. Thus, in the cross-sectional view shown in FIG. 1, the input surface 31 comprises a curvature, concave in this case, adapted to the curvature of the output surface 22 of the lens 2. It can be seen immediately that these two portions of surface cooperate by being similar in their curvature, or even totally identical. Moreover, the waveguide 3 can comprise a portion 34 forming a flaring from the elongated body 32 at the level of which the output of the light rays towards the input surface 31 occurs. This flared portion 34 has a cross-section which decreases progressively from the input surface 31 to the elongated body 32. The latter is moreover not necessarily of constant cross-section in its longitudinal direction. The funnel shape of the portion 34 makes it possible to progressively concentrate the light rays introduced through the input surface 31.

Figure 5:
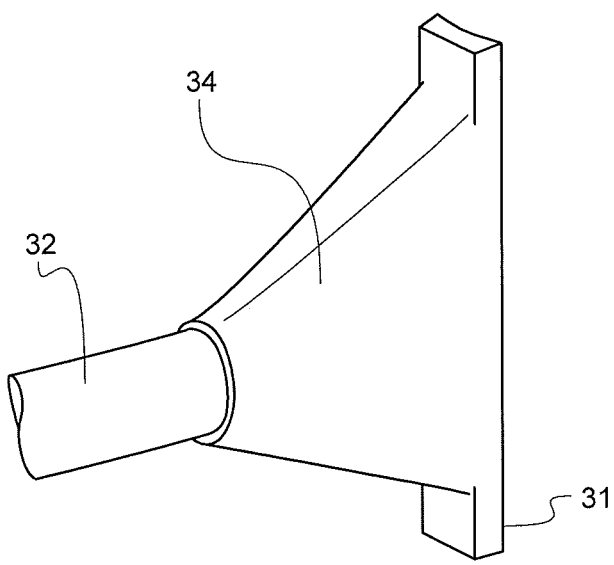
FIG. 5 shows a cross-sectional perspective view of an example of a mouth portion that the waveguide can have.

In the case shown in FIG. 5, the input surface 31 has the previously indicated curvature in a first direction of cross-section corresponding to that of FIG. 1 and has a substantially straight cross-section in cross-section plane perpendicular to the previous one. It will be noted that the input surface 31 is advantageously configured and situated with respect to the lens 2 so as not to interfere with the rotational mobility of the lens 2.

Figure 2:
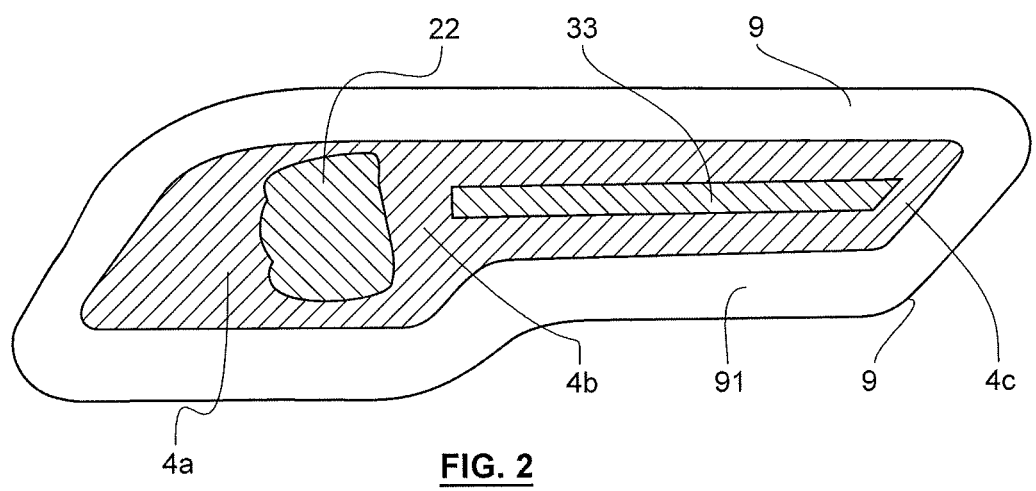
FIG. 2 shows a front view illustration of it.

Another aspect of the invention is the possible presence of shields, parts of which can be seen at the references 4a, 4b and 4c in FIG. 1 and in FIG. 2. In general, these portions of shield 4a, 4b, 4c can be carried by a single element, for example made of plastic, for example of dark color and possibly black, producing opacity to light. An example of the plastic part forming the shields 4a, 4b, 4c can be seen in the front view shown in FIG. 2. It will be noted that the portion of shield 4b makes it possible to form a visual discontinuity between the output surface 22 of the lens 2 and the output surface 33 of the waveguide 3. These two parts are functionally different and spaced in the frontal view of the headlamp that is equipped with them.

The parts of shield 4a, 4c make it possible, if they are present, to delimit the contour of the output surfaces 22 and 33.

Figure 3:
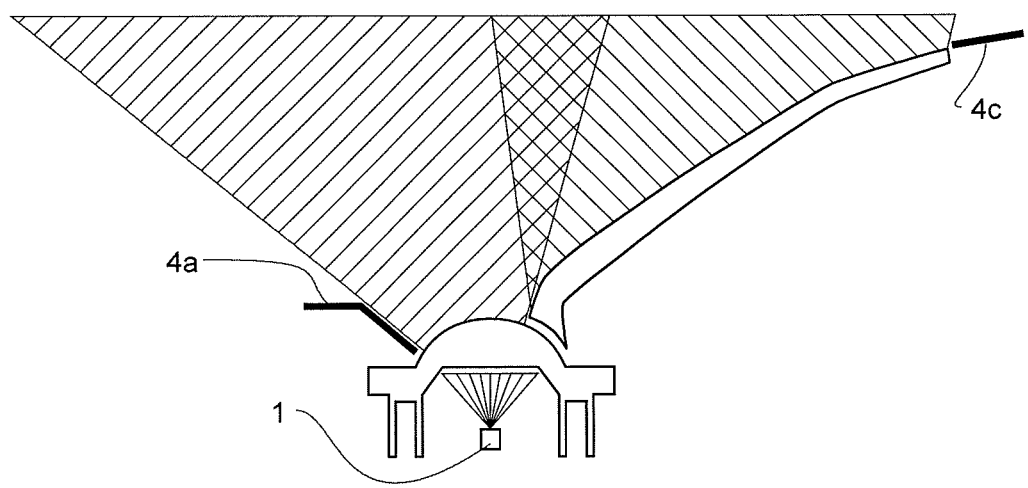
FIG. 3 shows cross-section of another embodiment of the invention similar to that of FIG. 1.
Figure 4:
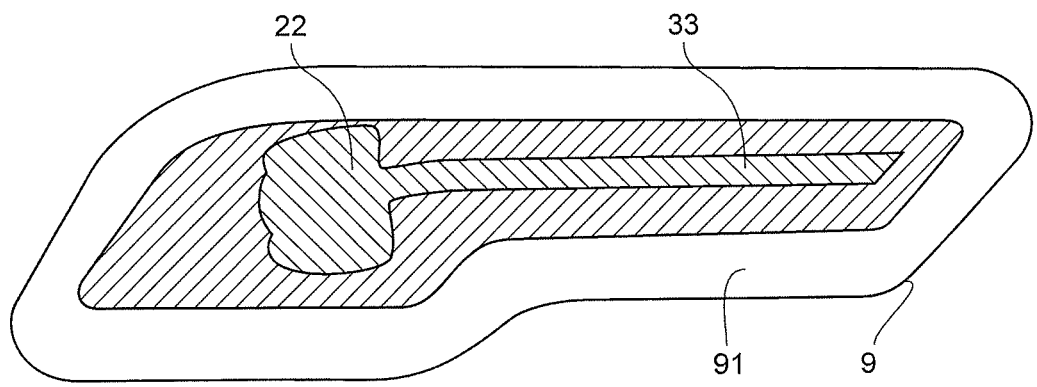
FIG. 4 shows a front view of the embodiment shown in FIG. 3.

A variant of the embodiment shown in FIGS. 1 and 2 is shown in FIGS. 3 and 4 respectively, in which the absence of the shield 4b is observed so much so that, in front view, the output surfaces 22 and 33 respectively of the lens 2 and of the waveguide 3, follow one another continuously for an observer placed in front of the headlamp.

Figure 6:
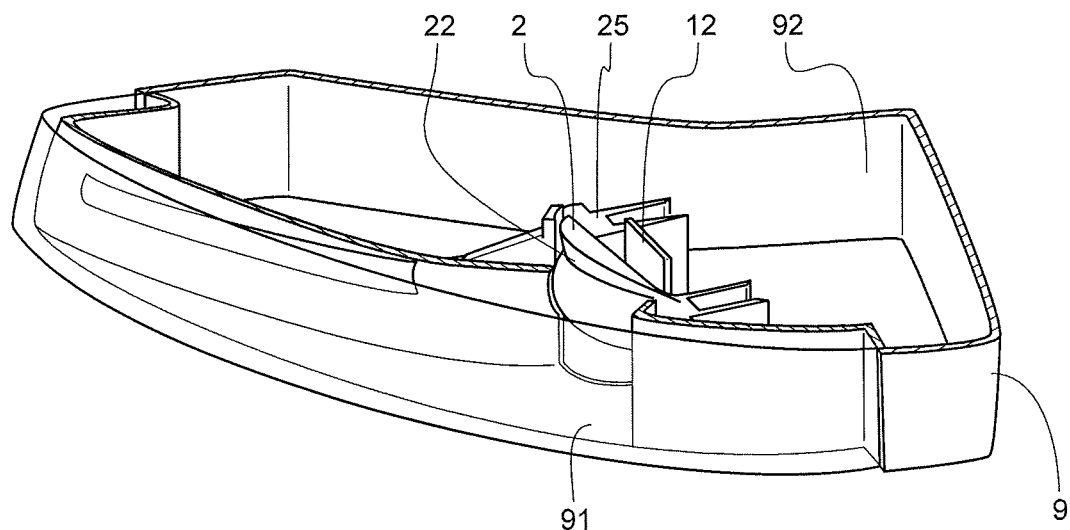
FIG. 6 shows an example of installation of the light emitting assembly in a headlamp body, in a cross-sectional perspective view.

In general, the system described here associating a lens 2 and a waveguide 3 in a specific way can be integrated in a headlamp body 9 a contour shape of which can be seen for example in FIGS. 2 and 4 with a façade 91 and of which a perspective and cross-sectional view is given in FIG. 6. In this figure, a chassis 92 of the body 9 is shaped in such a way as to define an internal space for receiving the system of the invention, and in particular the lens 2, the source 1, the waveguide 3 and possible shields 4a, 4b and 4c. These, as indicated previously, are shaped in one and the same piece in the form of a sheet advantageously made of plastic. FIG. 6 shows moreover the formation of a support 12 making it possible to receive the light source 1, particularly if it is a light emitting diode. The façade 91 of the body 9 advantageously presents a window made of transparent or translucent material allowing the output of the first and second beams 5, 6.

Figure 7:
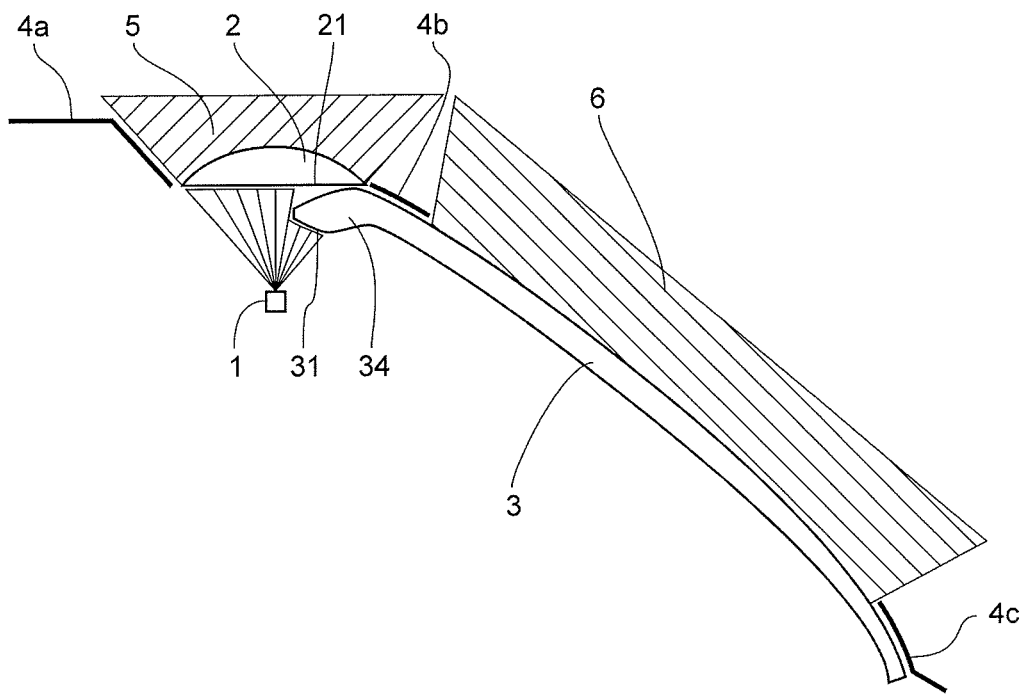
FIG. 7 shows another embodiment of the invention in a cross-section similar to that of FIG. 1.

FIG. 7 shows another embodiment of the invention constituting a variant with respect to the cases of the preceding figures, in particular in the relative positioning of the lens 2 and of the waveguide 3. In fact, in FIG. 7, the waveguide 3 is positioned in such a way that its input surface 31 is located upstream of the lens 2 with respect to the path of the light rays from the source 1. Thus, in this configuration, the input surface 31 interferes in such a way that a portion of the light rays normally having to reach the input surface 21 of the lens 2, enters into the waveguide 3. The latter is therefore placed such that it partially masks the input surface 21. In this case, contrary to the preceding case, the waveguide 3 can for example extend from the input surface 31 towards the rear of the headlamp whilst it preferably extends towards the front of the headlamp in the embodiments shown in FIGS. 1 à 4.

As for the rest, the embodiment shown in FIG. 7 can exhibit all or some of the features described previously for the other embodiments, in particular with the presence of shields 4a, 4b, 4c. The lens 2 can also be of the plano-convex type.

It will be noted that, in the different variants of the invention, it is advantageous for the waveguide to be independent of the mobility of the lens 2, so as not to modify the positioning of the output surface 33 of the waveguide 3 even when the inclination of the lens 2 is modified. Thus, the first and second beams 5, 6 are independent. This independence does not however harm the efficiency of the system thus constructed because the input surface 31 of the waveguide 3 such as it is constituted allows the desired gathering of light by the waveguide 3.

Thus, from a single light source 1, it is possible to produce the two beams 5, 6 simultaneously. At the same time, the presence of the second beam 6 does not functionally hamper the first beam 7 which can notably be adjustable in inclination. In general, it will be possible to use plastics of the polycarbonate or equivalent types for the different optical parts of the system and notably for the lens 2 and the waveguide 3. The size the input surface 31 will moreover be configured according to the quantity of light desired for the waveguide 3.

The invention is not limited to the described embodiments but extends to any embodiment conforming within its spirit.

REFERENCES

1. Source
11. Mean direction
12. Support
2. Lens
21. Input surface
22. Output surface
23. Pivoting axis
24. Lateral mount
25. Lateral mount
26. Drive lugs
27. Drive lugs
3. Waveguide
31. Input surface
32. Elongated body
33. Output surface
34. Input Portion
4a, b, c: Shield
5. First beam
6. Second beam
7. Inner zone
8. Outer zone
9. Body
91. Façade
92. Chassis

The invention claimed is:

1. A lighting and/or signaling system for motor vehicles, comprising:
    a light source;
    a lens configured to receive light rays coming directly or indirectly from the light source through an input surface of the lens and emit a first output beam providing a first regulatory lighting and/or signaling function through an output surface of the lens; and
    a waveguide configured to directly or indirectly receive light rays coming from the light source through an input surface of the waveguide and emit a second output beam through an output surface of the waveguide, the output surface of the waveguide extending entirely from one end adjacent to the input surface of the waveguide to a distal end opposite to the end adjacent to the input surface of the waveguide,
    wherein a coupling zone of the waveguide is located at least partially opposite a portion of either the input surface of the lens or the output surface of the lens,
    wherein the lens and the waveguide are mounted on a body, the lens being mobile in rotation on the body, and wherein the waveguide is outside and not in contact with a lamp support receiving the light source.

2. The system according to claim 1, wherein the body is mounted such that it is mobile in rotation in said system.

3. The system according to claim 2, wherein the waveguide is mounted such that it is mobile in rotation on the body.

4. The system according to claim 1, wherein the waveguide is mounted such that it is mobile in rotation on the body.

5. The system according to claim 1, wherein the coupling zone of the waveguide is formed by at least a portion of the input surface of the waveguide.

6. The system according to claim 1, wherein the coupling zone of the waveguide is formed by at least an elbow bend portion of the waveguide.

7. The system according to claim 6, wherein the input surface of the waveguide is configured so that its orthogonal projection in a plane perpendicular to the optical axis of the lens overlaps an orthogonal projection of said at least one from among the input surface of the lens and the output surface of the lens in said perpendicular plane.

8. The system according to claim 1, wherein the output surface of the waveguide is located on an elongated body of the waveguide.

9. The system according to claim 1, wherein the input surface of the waveguide has a concave curvature in a plane including the mean direction of emission of the source and the axis of rotation of the relative mobility of the lens and the waveguide.

10. The system according to claim 1, wherein the input surface of the waveguide is a surface located opposite a portion of the output surface of the lens.

11. The system according to claim 9, wherein the output surface of the lens is convex and has a curvature identical to that of the input surface of the waveguide in a plane including the mean direction of emission of the source and the axis of rotation of the relative mobility of the lens and the waveguide.

12. The system according to claim 10, wherein the output surface of the lens is convex and has a curvature identical to that of the input surface of the waveguide in a plane including the mean direction of emission of the source and the axis of rotation of the relative mobility of the lens and the waveguide.

13. The system according to claim 1, wherein the input surface of the waveguide is a surface located opposite a portion of the input surface of the lens.

14. The system according to claim 1, wherein the input surface of the waveguide includes at least one cavity.

15. The system according to claim 1, further comprising at least one intermediate shield obturating a portion of the output surface of the waveguide.

16. The system according to claim 1, configured in such a way that the first output beam is a beam of the fog lamp type.

17. The system according to claim 1, wherein the lens is mounted such that it is mobile on rotation on the body.

18. The system according to claim 1, wherein the coupling zone of the waveguide is formed by at least a portion of the input surface of the waveguide.

19. The system according to claim 1, wherein the waveguide includes a portion flaring from an elongated body to the input surface of the waveguide located at a mouth of the coupling zone, the portion including an increasing cross-section from the elongated body to the input surface of the waveguide.

20. The system according to claim 1, wherein the output surface of the waveguide includes decoupling means including at least one of prisms, a striae, and random shapes.

* * * * *